United States Patent
Sasi

(10) Patent No.: US 6,170,844 B1
(45) Date of Patent: Jan. 9, 2001

(54) DUAL BICYCLE CONNECTING KIT

(76) Inventor: Paul Sasi, 1235 W. Winona Ave., Chicago, IL (US) 60640

( * ) Notice: Under 35 U.S.C. 154(b), the term of this patent shall be extended for 0 days.

(21) Appl. No.: 09/293,555

(22) Filed: Apr. 15, 1999

(51) Int. Cl.$^7$ .................................................. B62K 13/06
(52) U.S. Cl. ............................................................ 280/209
(58) Field of Search ..................................... 280/209, 230, 280/231

(56) References Cited

U.S. PATENT DOCUMENTS

| | | | |
|---|---|---|---|
| 750,480 | * | 1/1904 | McLarty ............................... 280/209 |
| 1,170,148 | * | 2/1916 | Grogan .................................. 280/209 |
| 3,713,671 | | 1/1973 | Boyer . |
| 3,768,834 | * | 10/1973 | Singleton ............................. 280/209 |
| 3,794,352 | | 2/1974 | Popp . |
| 3,865,401 | | 2/1975 | Kingsly . |
| 3,866,945 | * | 2/1975 | Bingham .............................. 280/202 |
| 3,902,738 | * | 9/1975 | Gandrud ............................... 280/209 |
| 3,938,827 | * | 2/1976 | Johnson ............................... 280/209 |
| 4,093,258 | | 6/1978 | Ansel .................................... 280/231 |
| 4,288,089 | | 9/1981 | Thiessen . |
| 4,290,620 | | 9/1981 | Chika ................................... 280/209 |
| 4,834,410 | | 5/1989 | Parker . |
| 5,511,809 | * | 4/1996 | Sagi ..................................... 280/209 |

OTHER PUBLICATIONS

Sirenetta publication.

* cited by examiner

Primary Examiner—Kevin Hurley
(74) Attorney, Agent, or Firm—Welsh & Katz, Ltd.

(57) ABSTRACT

A novel dual bicycle connecting kit for connecting two bicycles in a side-by-side relationship. The kit may comprise a fixed handle bar coupling assembly attached to the first bicycle; one or more frame coupling assemblies attached at one end to the first bicycle and attached at the other end to the second bicycle. Also, one or more steering coupling assemblies may be attached at one end to the first bicycle and attached at the other end to the second bicycle. Another feature of the kit is that a canopy assembly may be provided having a canopy support frame and a canopy where the canopy support frame is attached to the first bicycle and the second bicycle and the canopy is attached to the canopy support frame. Alternate embodiments may provide a seat assembly having a seat support frame and seat wherein the seat support frame is attached to the first bicycle and the second bicycle and the seat is attached to the seat support frame. Still further alternate embodiments may have a basket assembly having a basket support frame and a basket wherein the basket support frame is attached to the first bicycle and the second bicycle and the basket is attached to the basket support frame.

20 Claims, 3 Drawing Sheets

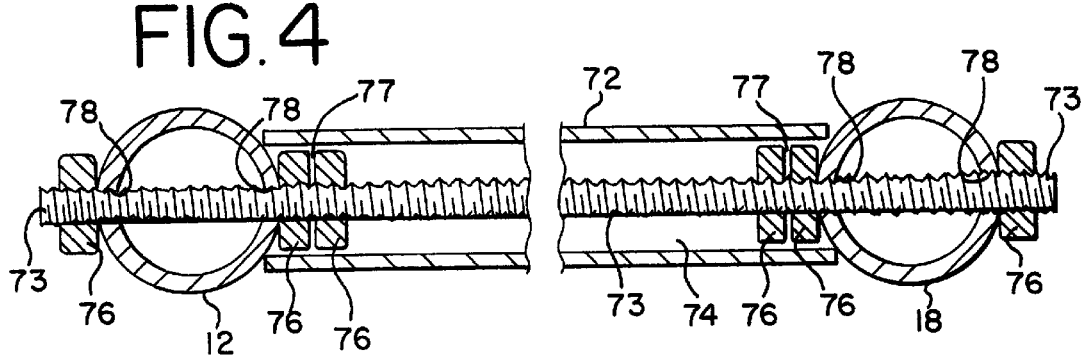
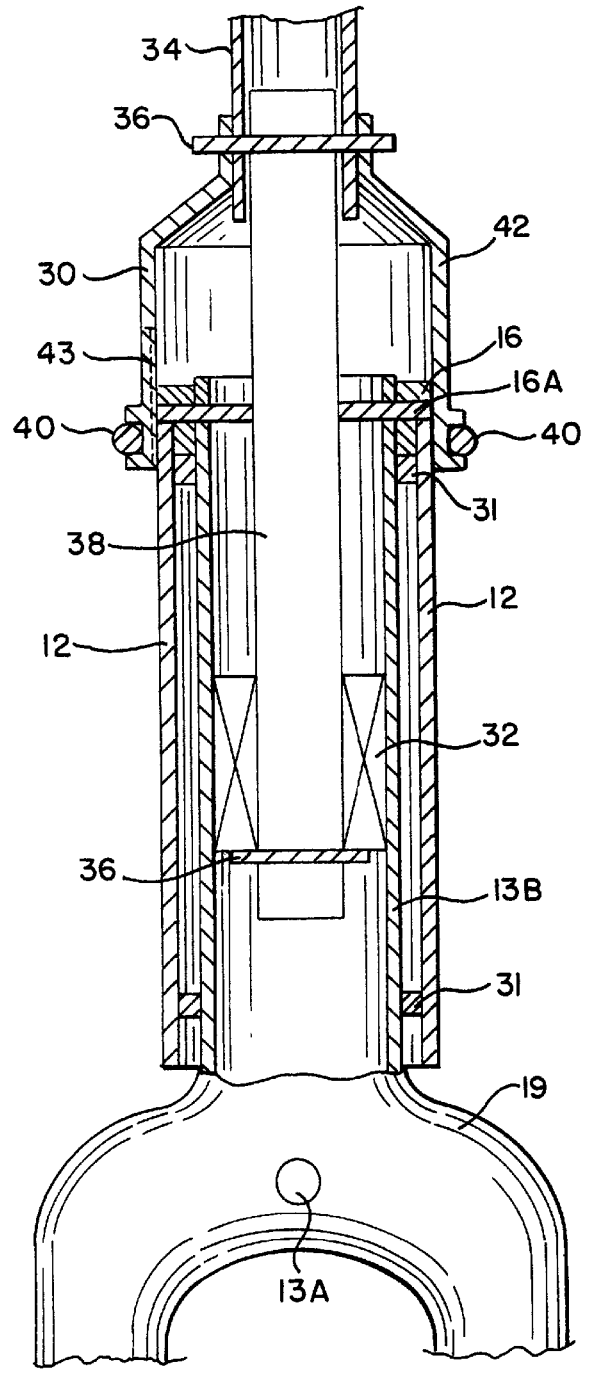

DUAL BICYCLE CONNECTING KIT

FIELD OF THE INVENTION

The present invention relates to dual bicycle connecting kits, and more particularly to dual bicycle connecting kits that provide for the bicycles to be joined in a side-by-side relationship and provide for enhanced operation of the joined bicycles.

BACKGROUND OF THE INVENTION

Bicycle connecting kits of various types are known in the art. Such devices are typically used for connecting or coupling a pair of bicycles in side-by-side or parallel relationship. It is well known that bicycles are growing ever more popular. Their relatively low purchase and operating costs make them available to most people. Often, two persons will go bicycle riding together. Therefore, it is desirable and fun for two bicycles to be coupled together in a side-by-side relationship for simultaneous operation of the two bicycles.

When the bicycles are coupled together in a side-by-side arrangement, the two bicycles operate as a single unit and provide a very stable device which can be enjoyed even by those who lack confidence in their sense of balance or who for other reasons are not able to use a standard bicycle. For example, the side-by-side connected bicycles can be useful for certain types of invalid persons who may require supervision and/or assistance so that such a bicycle can serve a rehabilitation function. In addition to the above advantages, the sociability afforded by the side-by-side connection can make such a bicycle just plain fun to ride, whether for couples or friends.

Various devices have been proposed for connecting two bicycles in a side-by-side relationship. However, previous dual bicycle connecting kits have inherent disadvantages. One of the disadvantages with prior art dual bicycle connecting kits is that they require that both riders of the dual bicycle steer the bicycle independently. This feature makes it more difficult for two persons to operate the connected side-by-side bicycles. For example, one bicycle rider may want to turn left while the other bicycle rider simultaneously wants to turn right thereby preventing either bicycle rider from completing a turn. This can provide for a very dangerous situation should a turn need to be completed quickly to avoid an accident.

SUMMARY OF THE INVENTION

The present invention overcomes these and other problems inherit in existing dual bicycle connecting kits. The present invention provides a dual bicycle connecting kit that provides for only one of the bicycles to have the ability to dictate the direction that the connected bicycles are going to travel. In other words, both bicycles allow the riders to power the bicycles but only one rider can steer the bicycles. Also, the kit is designed so as to require minimal structural modification to the existing two bicycles to join them in a side-by-side relationship.

The principal object of the present invention is to provide a novel dual bicycle connecting kit for joining two bicycles in a side-by-side relationship.

Another object of the present invention is to provide a novel dual bicycle connecting kit that can be provided in kit form and can easily connect two bicycles in a side-by-side relationship.

Still another object of the present invention is to provide a novel dual bicycle connecting kit that connects two bicycles and maintains one handle bar in a fixed position while allowing the second handle bar to steer the connected bicycles.

A further object of the present invention is to provide a novel dual bicycle connecting kit that requires minimal modification of the bicycles.

A further object of the present invention is to provide a novel dual bicycle connecting kit which is simple in design and inexpensive to construct, and is durable and rugged in structure.

Still further objects and advantages will become apparent from a consideration of the ensuing description and drawings of the invention.

These and other objects are achieved by a novel dual bicycle connecting kit of the present invention. In one form of the invention, a dual bicycle connecting kit is provided which can join a first bicycle and a second bicycle in a side-by-side relationship. The kit may comprise a fixed handle bar coupling assembly attached to the first bicycle; one or more frame coupling assemblies attached at one end to the first bicycle and attached at the other end to the second bicycle. Also, one or more steering coupling assemblies may be attached at one end to the first bicycle and attached at the other end to the second bicycle. Another feature of the kit is that a canopy assembly may be provided having a canopy support frame and a canopy wherein the canopy support frame is attached to the first bicycle and the second bicycle and the canopy is attached to the canopy support frame. Alternate embodiments may provide a seat assembly having a seat support frame and seat wherein the seat support frame is attached to the first bicycle and the second bicycle and the seat is attached to the seat support frame. Still further alternate embodiments may have a basket assembly having a basket support frame and a basket wherein the basket support frame is attached to the first bicycle and the second bicycle and the basket is attached to the basket support frame.

BRIEF DESCRIPTION OF THE DRAWINGS

FIG. 4 is a partial cross sectional view of a frame coupler assembly of the dual bicycle connecting kit of FIG. 1 taken along line 4—4 of FIG. 2; and FIG. 5 is partial cross sectional view of a fixed handle bar coupling assembly of the dual bicycle connecting kit of FIG. 1 taken along line 5—5 of FIG. 2.

DETAILED DESCRIPTION

Figure 1:
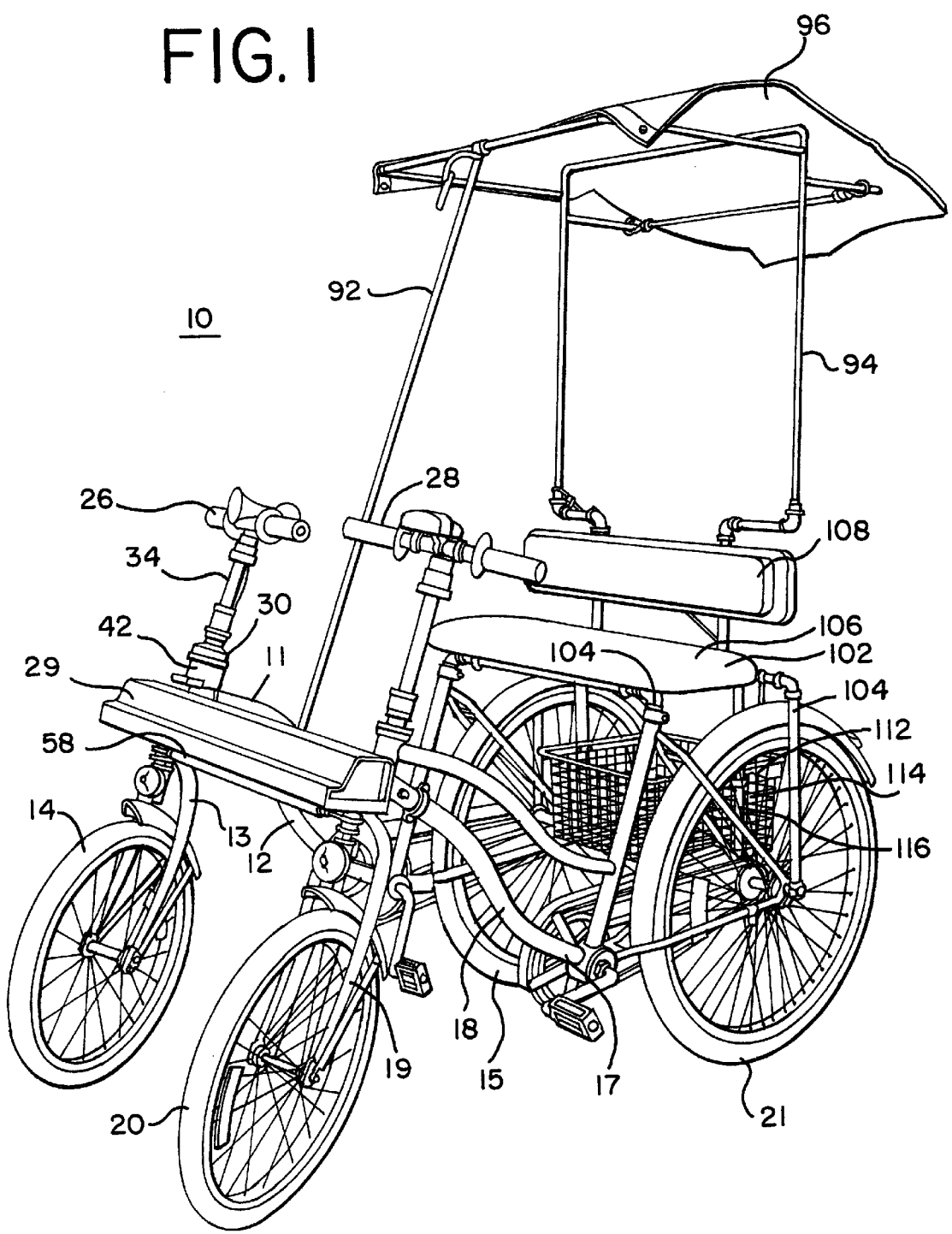
FIG. 1 is a perspective view of one embodiment of the dual bicycle connecting kit of the present invention shown in use connecting two bicycles in a side-by-side relationship.

FIG. 1 is a perspective view of one embodiment of the dual bicycle connecting kit 10 constructed in accordance with the present invention and shown connecting two bicycles in a side-by-side relationship. In FIG. 1, the first bicycle 11 comprises a frame 12, a fork 13 turnably connected to the frame 12, a front wheel 14 rotatably connected to the fork 13 and a rear wheel 15 rotatably connected to the frame 12. As best shown in FIGS. 3 and 5, the fork 13 may have a hole 13A and a shaft 13B. The second bicycle 17 comprises a frame 18, a fork 19 turnably connected to the frame 18, a front wheel 20 rotatably connected to the fork 19 and a rear wheel 21 rotatably connected to the frame 18. Similar to fork 13, the fork 19 may have a hole 19A and a shaft 19B. Further, as shown in FIGS. 1 and 2, one embodiment of the dual bicycle connecting kit 10 may comprise a fixed handle bar 26, a movable handle bar 28, a cover 29, a fixed handle bar coupling assembly 30, one or more stabilizer assemblies 44, a steering coupling assembly 58, one or more frame coupling assemblies 72 or 82, a canopy assembly 92, a seat assembly 102 and a basket assembly 112.

As shown in FIG. 5, the fixed handle bar coupling assembly 30 may comprise one or more bearings 31, one or more bearings 32, a neck 34, one or more pins 36, a shaft 38, a clamp 40 and an adapter 42. The neck 34, at one end, (as shown in FIG. 1) may be connected to the fixed handle bar 26. The connection may be achieved by any type of connector assembly or method as described anywhere herein or as is known to those skilled in the art, for example, such as with a nut, a clamp or by welding. The other end of the neck 34 may be connected to a shaft 38. The connection may be made by a pin 36 as shown in FIG. 5 or may be achieved by any other type of connector assembly or method as described anywhere herein or as is known to those skilled in the art. The shaft 38 may be positioned inside the fork shaft 13B with the bearing 32 positioned around the shaft 38 so that the fork shaft 13B is turnably mounted to the shaft 38. Further, a pin 36 or other device, such as a nut for example, may be positioned through or on the shaft 38 to maintain the necessary operating position of the shaft 38 with respect to the bearing 32 and the neck 34 and to prevent the bearing 32 from falling off the shaft 38. Also, the fork shaft 13B may be positioned inside the first bicycle frame 12 so that at least one bearing 31 is positioned around the fork shaft 13B and positioned adjacent the frame 12 so that the fork shaft 13B is turnably mounted inside the frame 12. Nut 16 and nut 16A may be provided to secure fork shaft 13B in the required position in frame 12. Bearings 31 and nuts 16, 16A may be part of the existing bicycle 11 or may be provided as part of the kit 10. The adapter 42, which may be in the shape of a bell as shown in FIG. 5, at one end may be positioned over and around the frame 12 and may be positioned at the other end over and around one end of the neck 34. A clamp assembly 40 may be provided to fit around the adapter 42 (as shown in FIG. 5) to lock the adapter 42 around the frame 12 and ensure that the handle bar 26 does not turn in either direction. The adapter 42 may also have one or more cuts or notches 43 along the side of the adapter 42 to allow the adapter 42 to compress around the frame 12 when the clamp 40 is tightened around the adapter 42. Clamp 40 may be positioned around the adapter 42 in any direction. In an alternate embodiment, the adapter 42 may be welded to the frame 12. The aforementioned elements may be made out of metal, plastic or any other material that will provide for proper operation of the dual bicycle connecting kit 10.

Figure 2:
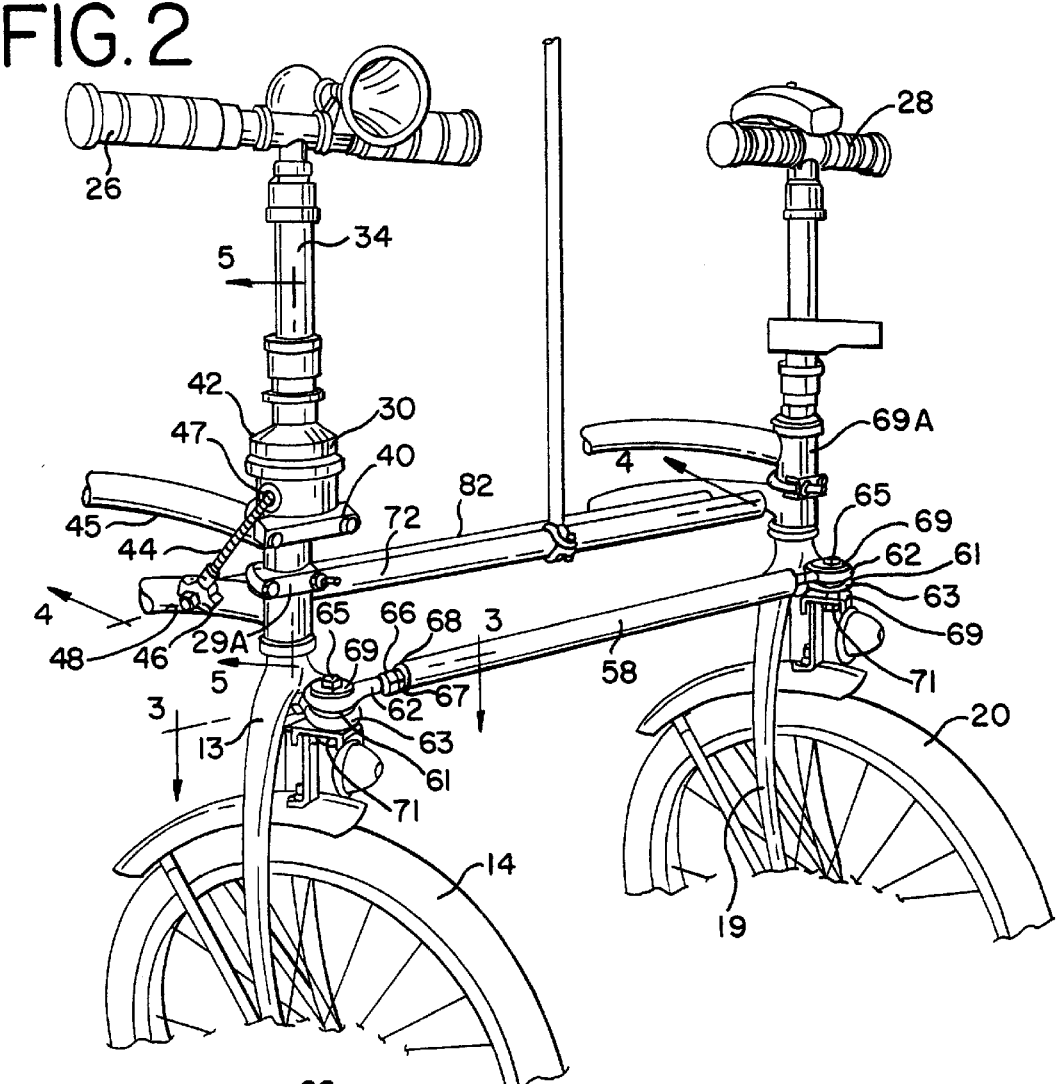
FIG. 2 is a perspective view of the front portion of the dual bicycle connecting kit of present invention of FIG. 1.
Figure 3:
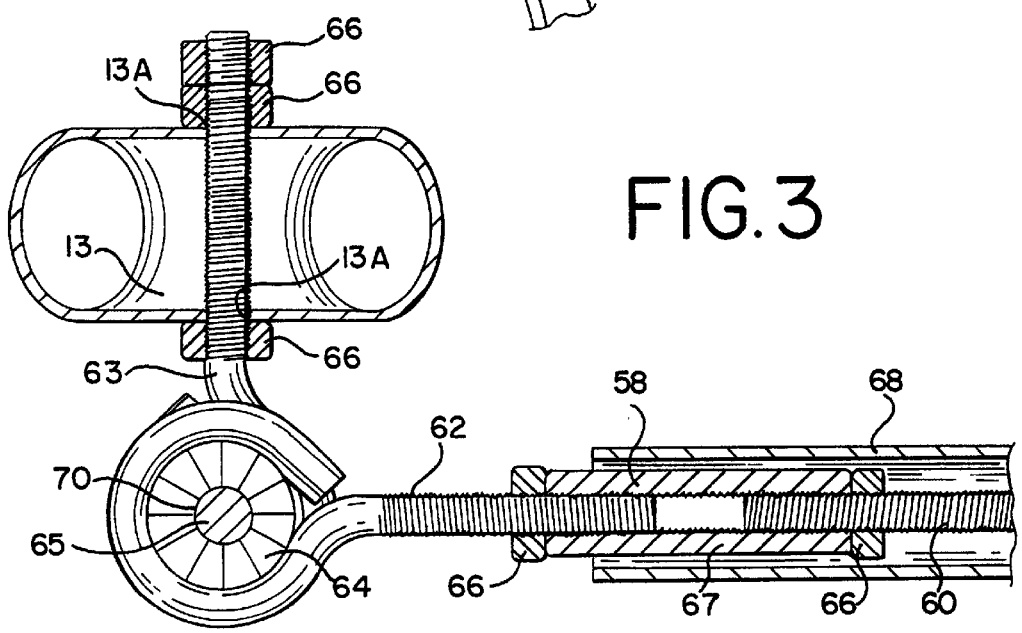
FIG. 3 is a cross sectional view of a coupler assembly of the dual bicycle connecting kit of FIG. 1 taken along line 3—3 in FIG. 2.

FIGS. 2 and 3 show the steering coupling assembly 58 which may comprise one or more threaded rods 60, one or more eyebolts 62, one or more eyebolts 63, one or more bearings 64 positioned between the eyebolts 62 and 63, one or more bolts 65 adapted to fit through the one or more bearings 64 and one or more washers 69 (note: for clarity purposes, washer 69 is not shown in FIG. 3). Further, the assembly 58 may comprise one or more barrel nuts 67, one or more covers 68, one or more washers 69, one or more spacers 61 and one or more fastener assemblies 71, for example such one or more nuts and one or more washers or any other type of fastener that will provide for proper operation of kit 10.

As shown in FIGS. 2 and 3, an eyebolt 63 may be connected to the fork 13 by placing the eyebolt 63 through holes 13A in the fork 13 until the eyebolt 63 extends through the fork 13 and exits the other side of the fork 13. One or more nuts 66 may be attached to the eyebolt 63 to ensure that the eyebolt 63 does not fall out of the hole 13A. In an alternate embodiment, as shown in FIG. 3, two nuts 66 may be attached to the eyebolt 63. It is noted that holes 13A may be preexisting in the fork 13 or holes 13A may need to be formed at the time of installation of the dual bicycle connecting kit 10. Then, as shown in FIGS. 2 and 3, one or more bearings 64 may be placed between the eyebolt 62 and the eyebolt 63 to enable relative rotation of the eyebolts about bolt 65 without binding. This will allow for the washers 69 to be placed on each side of the eyebolt/bearing assembly, as shown in FIG. 2, and provide for the bolt 65 to be inserted through both eyebolts 62 and 63, washers 69 and one or more bearings 64. In an alternate embodiment, one or more spacers 61 may be placed between bearings 64 if two or more bearings 64 are used in combination adjacent each other. With bolt 65 in place, a fastener assembly 71 may be attached to the bolt 65 to ensure that the bolt 65 does not fall out of the eyebolt/bearing assembly. Following assembly, the eyebolt 62 should be securely connected to the eyebolt 63 while allowing for the eyebolt 62 to rotate relative to the eyebolt 63. The entire above described assembly and operation for connecting the eyebolts 62 and 63 with the at least one bearing 64 to the first bicycle 11 is substantially identical for the mounting of second eyebolts 62 and 63 to the second bicycle 17. Once the eyebolt/bearing assemblies are attached to the first and second bicycles 11 and 17, the threaded rod 60 may be connected to the assemblies as shown in FIGS. 2 and 3. FIG. 3 shows one end of the treaded rod 60 connected to an eyebolt 62. In one embodiment, a barrel nut 67 is used to connect one end of the rod 60 to the eyebolt 62. In alternate embodiments, the rod 60 may be welded to the eyebolt 62 or connected by any other device or method that will provide for proper operation of the dual bicycle connecting kit 10. In yet another embodiment, nuts 66 may be positioned on the rod 60 on each side of the barrel nut 67 as shown in FIG. 3. The entire above described assembly and operation for connecting one end of the rod 60 to the first bicycle 11 is substantially identical for connecting the other end of the rod 60 to the second bicycle 17. Also, in an alternate embodiment, the cover 68 may be placed around the rod 60 to provide protection for the components covered and allow for a more aesthetic appearance of the steering coupling assembly 58. In yet other embodiments, rod 60 may be threaded only at each end. In still yet other embodiments, the eyebolts 62, 63 may be replaced with any other device that will provide for proper operation of the dual bicycle connecting kit 10 such as, for example, a commercial rod end as supplied by Quality Bearing and Components Company, Garden City Park, New York. This commercial rod end may include an eyebolt with integral bearing and lubricator device. In yet other alternate embodiments, the cover 29 (as best shown in FIG. 1) may be attached to the first and second bicycles 11, 17 by a clamp 29A or other fastener. The cover 29 may prevent dirt and other foreign matter from coming in contact with the steering coupling assembly 58. The cover 29 may also provide a more aesthetic appearance for the connected bicycles. The aforementioned elements may be constructed of plastic, metal, or any other material that will provide for proper operation of the dual bicycle connecting kit 10.

FIGS. 2 and 4 show the frame coupling assemblies 72 and 82. The frame coupling assemblies 72 and 82 may each comprise one or more threaded rods 73, one or more covers 74 that are adapted to fit over the threaded rod 73, one or more nuts 76 and one or more washers 77. The rod 73 may be inserted through hole 78 in the first bicycle 11 and hole 78 in the second bicycle 17. The holes 78 may be preexisting in bicycles 11 and 17 or the holes 78 may be constructed to adapt the bicycles 11 and 17 to accept rod 73. As shown in FIG. 4, nuts 76 and washers 77 may be placed on the rod 73 and adjusted to provide for the desired spacing of bicycles 11 and 17 and provide for the bicycles 11 and 17 to be in a side-by-side relationship. Also, in an alternate embodiment, the cover 74 may be placed around the rod 73 to provide protection for the components covered and allow for a more aesthetic appearance of the frame coupling assemblies 72 and 82. In another embodiment, rod 73 may be threaded only at each end. The aforementioned elements may be constructed of plastic, metal, or any other material that will provide for proper operation of the dual bicycle connecting kit 10.

As best shown in FIG. 2, an alternate embodiment may comprise one or more stabilizer assemblies 44. The stabilizer assembly may provide additional rigidity to the bicycle structure. The stabilizer assembly 44 may comprise an eyebolt 45, a clamp 46, one or more nuts 48, and one or more fastener assemblies 47, for example, a bolt and nut. One end of the eyebolt 45 may be mounted to the adapter 42 by one or more fastener assemblies 47. The other end of the eyebolt 45 may be mounted to rod 73 by a clamp 46 and/or a nut 48, or any other device capable of mounting the eyebolt 45 to the rod 73. The stabilizer assembly 44 may also be mounted to both sides of the adapter 42.

As shown in FIG. 1, the canopy assembly may comprise one or more support frames 94 and one or more canopies 96. The frame 94 may be constructed of several straight bars and several bends or elbows. The frame 94 may be molded to form a single piece structure or may be comprised of many individual components that disconnect easily and may be stored in a small space. Further, the frame 94 may be constructed identical in shape and configuration as shown in FIG. 1 or in virtually any other shape to provide for proper operation of the dual bicycle connecting kit 10. Also, the frame 94 may be constructed of steel, plastic or any other material that will provide for proper operation of the dual bicycle coupling kit 10. In one embodiment, the frame 94 may be mounted to the bicycles 11 and 17 as shown in FIG. 1 or in any other manner that will provide for proper operation of the dual bicycle connecting kit 10. Also, as shown in FIG. 1, the canopy 96 may be provided and attached to the frame 94 to provide shade for the riders of the coupled bicycles 11 and 17. The canopy 96 may be constructed of plastic, cloth or any other material capable of providing for the proper operation of the dual bicycle connecting kit 10.

Also shown in FIG. 1 is the seat assembly 102 which may comprise one or more support frames 104, one or more seat bottoms 106 and one or more seat backs 108. The frame 104 may be constructed of several straight bars and several bends or elbows. The frame 104 may be molded to form a single piece structure or may be comprised of many individual components that disconnect easily and may be stored in a small space. Further, the frame 104 may be constructed identical in shape and configuration as shown in FIG. 1 or in virtually any other shape to provide for proper operation of the dual bicycle connecting kit 10. Also, the frame 10 may be constructed of steel, plastic or any other material that will provide for proper operation of the dual bicycle connecting kit 10. The frame 104 may be mounted to the bicycles 11 and 17 as shown in FIG. 1 or in any other manner that will provide for proper operation of the dual bicycle connecting kit 10. The seat bottom 106 and seat back 108 may be constructed of a vinyl covering over a foam insert and with a wood base or the various components may be comprised of any other material that will provide for proper operation of the dual bicycle connecting kit 10. The seat bottom 106 and seat back 108 may be attached to the frame 104 as shown in FIG. 1 or in virtually any other manner and configuration as will provide for proper operation of the dual bicycle connecting kit 10.

FIG. 1 also shows the basket assembly 112 which may comprise one or more support frames 114 and one or more baskets 116. The frame 114 may be constructed of several straight bars and several bends or elbows. The frame 114 may be molded to form a single piece structure or may be comprised of many individual components that disconnect easily and may be stored in a small space. Further, the frame 114 may be constructed identical in shape and configuration as shown in FIG. 1 or in virtually any other shape to provide for proper operation of the dual bicycle connecting kit 10. Also, the frame 114 may be constructed of steel, plastic or any other material that will provide for proper operation of the dual bicycle connecting kit 10. The frame 114 may be mounted to the bicycles 11 and 17 as shown in FIG. 1 or in any other manner that will provide for proper operation of the dual bicycle connecting kit 10. Also, as shown in FIG. 1, one or more baskets 116 may be provided and attached to the frame 114 to provide a place to store anything that the riders of bicycles 11 and 17 may need to bring with them on their excursion. The basket 116 may be constructed of plastic, steel or any other material capable of providing for the proper operation of the dual bicycle connecting kit 10.

In use, two persons sit on the connected bicycles 11 and 17. Both persons may operate the pedals on their respective bicycle 11 or 17 but only the person sitting on bicycle 17 may steer the connected bicycles 11 and 17. As previously described herein, only handle bar 28 may control the direction that the connected bicycles 11 and 17 may travel. Handle bar 26 is stationary. When handle bar 28 is turned left or right, fork 19 is turned in the same direction. The steering coupling assembly 58 simultaneously turns fork 13 in the same direction as fork 19. Accordingly, the connected bicycles 11 and 17 will travel in the direction handle bar 28 is turned. One person may also operate the connected bicycles 11 and 17. This may be desirable if only one person is available or perhaps if one of the riders becomes ill or injured or is otherwise unable to operate bicycle 11.

Specific embodiments of novel methods and apparatus for construction of a novel dual bicycle connecting kit according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A dual bicycle connecting kit for connecting a first bicycle and a second bicycle in a side-by-side relationship, said first bicycle and second bicycle each having a handle bar, a frame and a fork, said kit comprising:

a fixed handle bar coupling assembly attached to the first bicycle and positioned between the first handle bar and the first frame to prevent the first handle bar from turning with respect to the first frame while allowing the first bicycle fork to rotate;

at least one frame coupling assembly attached at one end to the first bicycle and attached at the other end to the second bicycle;

at least one steering coupling assembly attached at one end to the first bicycle and attached at the other end to the second bicycle;

a canopy assembly having a canopy support frame and a canopy wherein the canopy support frame is attached to the first bicycle and the second bicycle and the canopy is attached to the canopy support frame;

a seat assembly having a seat support frame and a seat wherein the seat support frame is attached to the first bicycle and the second bicycle and the seat is attached to the seat support frame; and a basket assembly having a basket support frame and a basket wherein the basket support frame is attached to the first bicycle and the second bicycle and the basket is attached to the basket support frame.

2. The dual bicycle connecting kit of claim 1 wherein the fixed handle bar coupling assembly comprises a neck, a pin, a shaft connected to the neck by the pin, at least one bearing adapted to fit around the shaft, a means for maintaining the bearing on the shaft, an adapter attached to the neck, and a means for attaching the adapter to the first bicycle.

3. The dual bicycle connecting kit of claim 2 wherein the means for attaching the adapter to the first bicycle is a clamp.

4. The dual bicycle connecting kit of claim 1 further comprising at least one stabilizer assembly connected at one end to the fixed handle bar coupling assembly and connected at the other end to the first bicycle.

5. The dual bicycle connecting kit of claim 1 wherein the steering coupling assembly comprises at least one rod with threads on at least each end of the rod, at least two eyebolts, at least one bearing positioned between the eyebolts and adapted to receive at least one means for rotatably connecting the at least two eyebolts and the at least one bearing, and at least one means for attaching at least one eyebolt to the at least one rod and attaching at least one eyebolt to the first bicycle and attaching at least one eyebolt to the second bicycle.

6. The dual bicycle connecting kit of claim 5 wherein the means for rotatably connecting comprises at least one bolt and at least one nut.

7. The dual bicycle connecting kit of claim 5 wherein the steering coupling assembly further comprises a cover adapted to fit over substantially the entire length of the rod.

8. The dual bicycle connecting kit of claim 1 wherein the frame coupling assembly comprises at least one rod with threads one at least each end of the rod, and at least one means for connecting one end of the rod to the first bicycle and the other end of the rod to the second bicycle.

9. The dual bicycle connecting kit of claim 8 wherein the frame coupling assembly further comprises a cover adapted to fit over substantially the entire length of the rod.

10. The dual bicycle connecting kit of claim 1 wherein the seat is comprised of a seat bottom and a seat back.

11. A dual bicycle connecting kit for connecting a first bicycle and a second bicycle in a side-by-side relationship, said first bicycle and second bicycle each having a handle bar, a frame and a fork, said kit comprising:

a fixed handle bar coupling assembly attached to the first bicycle and positioned between the first handle bar and the first frame to prevent the first handle bar from turning with respect to the first frame while allowing the first bicycle fork to rotate;

at least one frame coupling assembly attached at one end to the first bicycle and attached at the other end to the second bicycle; and at least one steering coupling assembly attached at one end to the first bicycle and attached at the other end to the second bicycle.

12. The dual bicycle connecting kit of claim 11 wherein the fixed handle bar coupling assembly comprises a neck, a pin, a shaft connected to the neck by the pin, at least one bearing adapted to fit around the shaft, a means for maintaining the bearing on the shaft, an adapter attached to the neck, and a means for attaching the adapter to the first bicycle.

13. The dual bicycle connecting kit of claim 12 further comprising at least one stabilizer assembly connected at one end to the fixed handle bar coupling assembly and connected at the other end to the first bicycle.

14. The dual bicycle connecting kit of claim 11 wherein the steering coupling assembly comprises at least one rod with threads on at least each end of the rod, at least two eyebolts, at least one bearing positioned between the eyebolts and adapted to receive at least one means for rotatably connecting the at least two eyebolts and the at least one bearing, and at least one means for attaching at least one eyebolt to the at least one rod and attaching at least one eyebolt to the first bicycle and attaching at least one eyebolt to the second bicycle.

15. The dual bicycle connecting kit of claim 14 wherein the steering coupling assembly further comprises a cover adapted to fit over substantially the entire length of the rod.

16. The dual bicycle connecting kit of claim 11 wherein the frame coupling assembly comprises at least one rod with threads one at least each end of the rod, and at least one means for connecting one end of the rod to the first bicycle and the other end of the rod to the second bicycle.

17. The dual bicycle connecting kit of claim 16 wherein the frame coupling assembly further comprises a cover adapted to fit over substantially the entire length of the rod.

18. The dual bicycle connecting kit of claim 11 further comprising a seat assembly having a seat support frame and a seat wherein the seat support frame is attached to the first bicycle and the second bicycle and the seat is attached to the seat support frame.

19. The dual bicycle connecting kit of claim 11 further comprising a canopy assembly having a canopy support frame and a canopy wherein the canopy support frame is attached to the first bicycle and the second bicycle and the canopy is attached to the canopy support frame.

20. A method for joining a first bicycle and a second bicycle in a side-by-side relationship; said method comprising:

providing a fixed handle bar assembly and attaching said assembly to the first bicycle and positioning the fixed handle bar assembly between the first handle bar and the first frame to prevent the first handle bar from turning with respect to the first frame while allowing the first bicycle fork to rotate;

providing at least one frame coupling assembly and attaching one end of each frame coupling assembly to the first bicycle and attaching the other end of each frame coupling assembly to the second bicycle; and providing at least one steering coupling assembly and attaching one end of each steering coupling assembly to the first bicycle fork and attaching the other end of the steering coupling assembly to the second bicycle fork so as to allow the first bicycle fork and second bicycle fork to rotate substantially in unison.

* * * * *